(12) United States Patent
Büttner et al.

(10) Patent No.: US 8,963,394 B2
(45) Date of Patent: Feb. 24, 2015

(54) CAGE ROTOR WITH STARTING BAR

(75) Inventors: Klaus Büttner, Hollstadt (DE); Klaus Kirchner, Ostheim (DE); Michael Müller, Bad Kissingen (DE)

(73) Assignee: Siemens AG, München, Ingolstadt ( * ) Notice: Subject to any disclaimer, the term of this patent is extended or adjusted under 35 U.S.C. 154(b) by 5 days.

(21) Appl. No.: 13/391,147

(22) PCT Filed: Aug. 13, 2010

(86) PCT No.: PCT/EP2010/061820
§ 371 (c)(1),
(2), (4) Date: Feb. 17, 2012

(87) PCT Pub. No.: WO2011/020788
PCT Pub. Date: Feb. 24, 2011

(65) Prior Publication Data
US 2012/0187796 A1    Jul. 26, 2012

(30) Foreign Application Priority Data
Aug. 19, 2009   (EP) .................................... 09168157

(51) Int. Cl.
*H02K 17/00* (2006.01)
*H02K 17/20* (2006.01)
*B22D 19/00* (2006.01)
*H02K 15/00* (2006.01)

(52) U.S. Cl.
CPC .......... *H02K 17/205* (2013.01); *B22D 19/0054* (2013.01); *H02K 15/0012* (2013.01)
USPC .......................................... 310/211; 310/212

(58) Field of Classification Search
USPC ........... 310/211–213, 156.78, 156.79, 156.81
See application file for complete search history.

(56) References Cited

U.S. PATENT DOCUMENTS 2,386,138 A * 10/1945 Pancher ........................ 310/211
6,246,141 B1 * 6/2001 Bailey ............................ 310/211
8,274,190 B2 * 9/2012 Alexander et al. ............. 310/211

FOREIGN PATENT DOCUMENTS

| CN | 1780116 A | 5/2006 | |
| DE | 2756685 A1 | 7/1978 | |
| DE | 4308683 A1 | 9/1994 | |
| DE | 19901195 A1 | 7/2000 | |
| JP | 1028360 A | 1/1989 | |
| JP | 10234166 A | 9/1998 | |
| JP | 2005278373 | * 10/2005 | H02K 17/16 |
| RU | SU 1288831 | 2/1982 | |
| SU | 61124 | 11/1941 | |
| UA | 27993 | 10/2000 | |

* cited by examiner

*Primary Examiner* — Dang Le
(74) *Attorney, Agent, or Firm* — Henry M. Feiereisen LLC (57) ABSTRACT

The invention relates to a cage rotor for an asynchronous machine (1) comprising starting bars for improving the starting behavior. The invention further relates to a method for producing such a cage rotor. In order to achieve as great an efficiency as possible, the cage rotor comprises a laminated rotor core (2) having grooves (3) and operating bars (5; 6; 7; 8; 15) disposed in the grooves (3) and contacting the laminated rotor core (2) directly on the inner groove base as seen in the radial direction of the cage rotor, wherein the operating bars (5; 6; 7; 8; 15) comprise partial cladding (9; 10; 11) enclosing an outer surface of the operating bars (5; 6; 7; 8; 15) as seen in the radial direction (12) of the cage rotor, wherein the material of the operating bars (5; 6; 7; 8; 15) comprises a greater specific conductivity than the material of the partial cladding (9; 10; 11).

25 Claims, 3 Drawing Sheets

CAGE ROTOR WITH STARTING BAR

CROSS-REFERENCES TO RELATED APPLICATIONS

This application is the U.S. National Stage of International Application No. PCT/EP2010/061820, filed Aug. 13, 2010, which designated the United States and has been published as International Publication No. WO 2011/020788 and which claims the priority of European Patent Application, Serial No. 09168157.7, filed Aug. 19, 2009, pursuant to 35 U.S.C. 119 (a)-(d).

BACKGROUND OF THE INVENTION

The invention relates to a cage rotor for an asynchronous machine comprising starting bars for improving its starting behavior. The invention further relates to a method for manufacturing a cage rotor of this type.

A cage rotor is known from JP 1028360 A in which the operating bars made of copper are inserted into grooves of a laminated rotor core such that said bars rest against a radially inwards-directed groove base of the laminated rotor core and a residual cross-section not filled with the operating bars remains in a radially outer area of the grooves. This residual cross-section is filled with molten aluminum in a die casting process. After the melt has hardened starting bars made of aluminum are thus formed which, as a result of the material used, have a higher electrical resistance than the operating bars made of copper.

As a result of the skin and proximity effect the secondary current of an asynchronous machine is displaced during starting of the machine in the direction of the outer groove area. Since the starting bars made of aluminum are arranged in this outer groove area, the asynchronous machine experiences a high resistance during starting which in its turn has a favorable effect on the torque behavior of the machine. As soon as the machine has reached its rated speed the secondary current essentially flows in the better-conducting operating bar made of copper. The efficiency of the asynchronous machine is in its turn influenced in a positive manner by this.

So-called double bar grooves are also widespread in cage rotors with operating and starting bars, in which, as seen radially, an internal groove made from a more conductive material is provided and, as seen radially, an outer groove is provided for a starting bar with lower conductivity. The two grooves are separated from one another by a scatter web.

SUMMARY OF THE INVENTION

The underlying object of the invention is to specify a cage rotor for an asynchronous machine with a good starting behavior and a high level of electrical efficiency.

This object is achieved by a cage rotor for an asynchronous machine including:
  a laminated rotor core with grooves
  operating bars disposed in the grooves which, as seen in the radial direction of the cage rotor, rest on the inner groove base directly on the laminated rotor core,
with the operating bars having a partial sheathing which, as seen in a radial direction of the cage rotor, sheathes external surfaces of the operating bars, with the material of the operating bars having a higher specific conductivity value than the material of the partial sheathing.

The object is further achieved by a method for manufacturing a cage rotor for an asynchronous machine, including:
  Insertion of operating bars into grooves of a laminated rotor core such that, as seen in the radial direction of the cage rotor, the operating bars rest directly at the inner groove base on the laminated rotor core and a free space remains, as seen in the radial direction of the cage rotor, at the outer groove area, which is not occupied by the operating bars,
  Die casting of end-face-side short-circuit rings and a partial cladding of the operating bars in each groove, with the partial cladding completely filling up the free space and cladding an outer surface of the operating bars as seen in the radial direction of the cage rotor,
with a material being used as the metal melt having a lower specific conductivity value than the material of the operating bars.

The invention is based on the knowledge that the electrical efficiency of the asynchronous machine for a double-bar rotor can be greatly improved without appreciably influencing the starting behavior if the operating bar is embodied with a greater bar height so that said bar extends far in the direction of the rotor diameter outwards into the groove. This is achieved precisely by the outer surface of the operating bars, as seen radially, being sheathed with the partial sheathing made from a material with lower electrical conductivity, then during the starting moment in which comparatively high-frequency currents flow in the rotor, the secondary current flowing in any event only in a relatively tightly-restricted area of the groove which faces towards the outer diameter of the cage rotor. The skin effect and the proximity effect cause the current to be concentrated onto this surface area, which surrounds the operating bars on their outer surfaces as seen radially. Inventively the largest possible part of the groove surface is thus made available without permitting the starting moment a significant current flow within the operating bar. By comparison with a conventional double-bar groove, the operating bar is thus inventively extended into the area of the starting bar in accordance with a conventional design without the starting behavior being negatively influenced by this. In operation after starting of the asynchronous machine, a bar which is as high as possible, the operating bar, is available in this way made of the material with greater electrical conductivity, so that, in operation under rated conditions, a very high efficiency can be achieved. By contrast the starting bar known from the prior art is reduced to the shape of a partial sheathing, the cross-section of which corresponds to the current density profile in starting mode. Ideally a cross-sectional surface is selected for the partial sheathing which during the starting of the asynchronous machine would essentially carry the current if the complete groove were to be filled with the material of the partial sheathing.

A higher groove fill factor likewise leads to a high electrical efficiency, so that an embodiment of the invention is advantageous in which the partially sheathed operating bars completely fill the grooves.

A shaping of the operating bar and of the partial sheathing, which in an advantageous embodiment of the invention causes the desired projection of the operating bar into the radially outer groove area, is characterized in that the partial sheathing is shaped into a concave shape on the side facing towards the operating bar and into a convex shape on the side facing away from the operating bar.

A high level of efficiency, especially during operation under rated conditions and a high short-circuit moment can be achieved in an embodiment of the invention by the material of the operating bars being copper and the material of the partial sheathing being aluminum, aluminum also has the advantage of having a low specific mass density and thus enabling the mass inertia moment of the cage rotor to be reduced.

The cage rotor also preferably has short-circuit rings made from the material of the partial sheathing, which make electrical contact between the operating bars and the partial sheathing of the operating bars on both end face sides of the cage rotor. In an embodiment of the invention in which the partial sheathing consists of aluminum, in accordance with this embodiment the short-circuit rings are also manufactured from aluminum. Particularly in the area of the short-circuit rings, the effective conductor cross section is comparatively large so that here the smaller specific conductivity value of aluminum compared to copper is not so decisive for the efficiency of the asynchronous machine. By contrast the mass of the cage rotor is kept relatively small by the choice of this material so that the asynchronous machine is especially well equipped for a dynamic range of uses.

A cage rotor in which the short-circuit rings are manufactured from the same material as the partial sheathing allows a very simple implementation in a further advantageous embodiment of the invention, in that the partial sheathing and the short-circuit rings are cast from a metal melt. For example if the short-circuit rings and the partial sheathing consist of aluminum, a cage rotor of this type can be manufactured at relatively low cost especially for smaller electrical machines by means of an aluminum die casting process. Copper is a suitable material for the operating bars in this case.

Especially when an aluminum melt is used and the operating bars are made of copper it also proves advantageous to tin the operating bars at least at the bar ends on which the short-circuit rings are disposed before the casting process. This creates a mechanical and electrical binding of the operating bars to the short-circuit rings which also withstands the thermal cycles occurring during operation. If the tinned bar ends of the copper operating bars are brought into contact with the aluminum melt, the coating thus created is melted. When the aluminum melt hardens a mixed crystalline alloy layer forms between the melt which forms the short-circuit rings and the operating bars, which results from the extremely high binding forces between the operating bars and the short-circuit rings.

A similar effect can be achieved as an alternative by an embodiment of the invention in which the operating bars, at least at the bar ends at which the short-circuit rings are disposed, having an electrically-applied coating, with the coating comprising the material of the short-circuit rings. If an aluminum melt is used, an aluminum layer is electrically applied in this case before a die casting process. Here too the aluminum layer already described above is produced after the hardening of the melt.

A further advantageous embodiment of the inventive cage rotor is characterized in that the operating bars are designed in particular as standardized flat bars. A special groove geometry expediently enables care to be taken that the flat bars rest directly at the radially inner groove base on the laminated rotor core. In particular when a die casting process is used to form the partial sheathing and the short-circuit rings, it is further advantageous for each groove to have surfaces for this purpose, the lower areas of which are suitable for fixing the flat bars before the casting. Such surfaces enable tipping of the flat bars to be prevented before the die casting and an unsymmetrical layout to be produced as a result. Especially if standardized flat bars are involved, a very tight fit between the flat bars and the radially inner groove area can be selected, since standard flat bars have very narrow tolerances in respect of their width tolerance. If the grooves of the laminated rotor core are initially equipped with the flat bars in this way, the remainder of the groove surface is filled with cast material so that favorable partial sheathing for the starting behavior is produced in the radially outwards-directed area of the groove. The use of the die casting process has the advantage here that the flat bars can be pressed deep into the groove base so that the flat bars are reliably attached relative to vibrations and force stresses occurring in the laminated rotor core.

BRIEF DESCRIPTION OF THE DRAWING

The invention will be described and explained below with reference to the exemplary embodiments shown in the figures, in which.

DETAILED DESCRIPTION OF PREFERRED EMBODIMENTS

Figure 1:
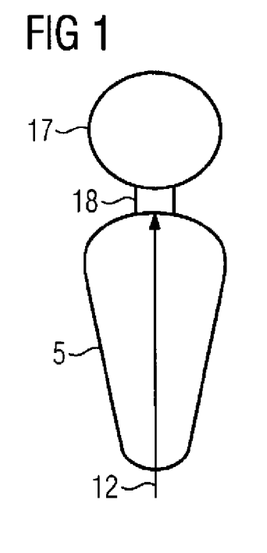
FIG. 1 shows a double-bar groove known from the prior art.

FIG. 1 shows a double-bar groove known in accordance with the prior art. This double-bar groove is arranged in a cage rotor of an asynchronous machine. In the figure the arrow indicates a radial direction 12 pointing from the machine shaft to the outer circumference of the cage rotor. Directed radially inwards is be understood here as well as in the application as a whole as a direction pointing from the cage outer jacket radially towards its axis of rotation, directed radially outwards is accordingly to be seen as a direction pointing from the axis of rotation of the cage rotor radially towards the cage outer jacket.

The double-bar groove comprises two groove areas. A first groove area, as seen in radial direction 12, is arranged inside and is filled by an operating bar 5. This operating bar 5 is made of copper and thus possesses a good electrical conductivity value.

Located in the area lying radially outwards is a starting bar 17 made of aluminum. Aluminum has the lower specific conductivity value compared to copper. As a result of the skin effect and the proximity effect, during the starting up of the asynchronous machine the current flow will essentially occur in the outer areas of the grooves as seen in the radial direction 12. Accordingly during the starting process, in which comparatively high-frequency currents flow in the cage rotor, the current will primarily be conveyed through the starting bars 17. This causes the cage rotor to have a higher effective ohmic resistance during starting, which has a positive effect on the starting moment of the asynchronous machine. As the speed increases the current displacement attributable to the skin or proximity effect reduces more and more, the current thus commutes increasingly to the operating bars. The ohmic resistance of the cage rotor thus falls as the machine speed rises, which increases the efficiency of the machine.

The operating bar groove and the starting bar groove are separated from one another by a very narrow web 18. The web 18, which is also referred to as a scatter web, reduces the effective surface available for the current flow at the moment of starting. This too increases the resistance and thus improves the starting behavior of the machine. It is however evident that through this method the efficiency of the motor is significantly reduced to the benefit of the starting behavior, since the operating bar 5 does not have the greatest possible surface that could be wished in operation under rated conditions of the asynchronous machine. The double-bar groove shown accordingly represents a compromise between starting behavior with high torque and electrical efficiency.

Figure 2:
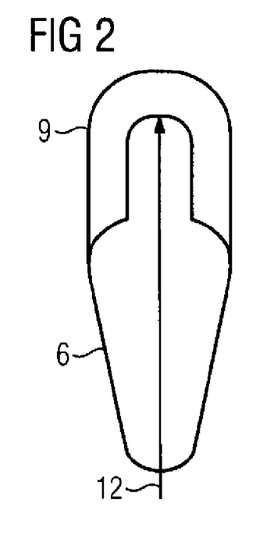
FIG. 2 shows a sheathed operating bar in accordance with an embodiment of the invention.

FIG. 2 shows a sheathed operating bar 6 in accordance with an embodiment of the invention. Here too the radial direction 12 from the axis of the cage rotor is indicated by an arrow. The operating bar 6 rests in the radially inner groove base directly on the laminated rotor core of the asynchronous machine. It involves a copper bar having a high specific electrical conductivity value. This operating bar 6 is characterized by a particular shape. Thus the operating bar 6 has a protrusion which projects into the outer area of the groove as seen radially. The side surfaces of this protrusion are sheathed with a partial sheathing 9. This partial sheathing 9 involves a hardened aluminum melt which has been applied by means of an aluminum die casting process. For this purpose the laminated rotor core is first equipped with the operating bars 6 and placed in a die casting mold. Subsequently in an aluminum die casting process, short-circuit rings are cast onto the laminated rotor core and simultaneously the free space remaining in the grooves is filled with aluminum melt. After the hardening of the melt the partial sheathing 9 shown is thus formed which, as a result of the choice of material, has a higher specific electrical resistance than the operating bars themselves.

Figure 3:
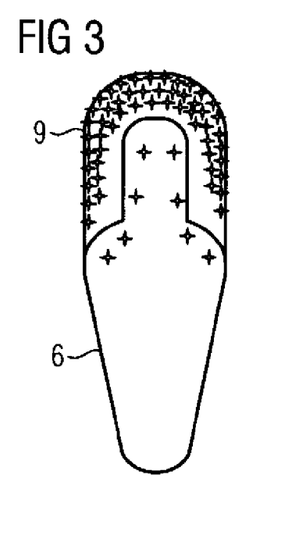
FIG. 3 shows the operating bar according to FIG. 2 during the starting process.

FIG. 3 shows an operating bar 6 in accordance with FIG. 2 during a starting process of the asynchronous machine. It can clearly be seen that, as a result of the skin and proximity effects, the current flows almost entirely in the partial sheathing 9. Through this the current "sees" a higher effective electrical resistance of the cage rotor through which the starting torque of the machine is increased. The current displacement effects mentioned result in a current distribution which essentially corresponds to the shape of the partial sheathing 9. The partial sheathing 9 has a concave shape on the side facing towards the operating bar 6. This produces a type of hood shape which encloses the pins of the operating bar 6 protruding into the outer groove area. Even if, as is known in the prior art. The complete outer groove area were to be filled with the material of the starting bars, generally aluminum, in this bar-shaped area current would barely flow in any event during starting. Accordingly a maximum copper surface for operation under rated conditions is provided by the operating bar 6 shown with the hood-shaped partial sheathing 9 and thus the electrical efficiency is kept as high as possible without having to forego the improvement of the starting behavior able to be achieved by the starting bars.

Figure 4:
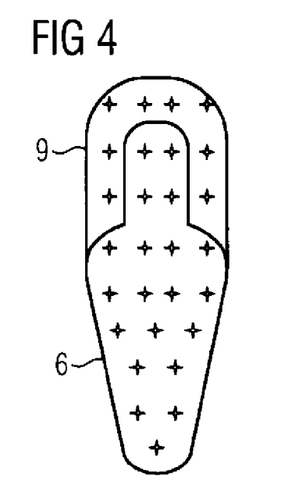
FIG. 4 shows the operating bar according to FIG. 2 during operation at rated speed.

Thus FIG. 4 shows the operating bar according to FIG. 2 during operation at the rated speed. Because of the higher electrical conductivity value of the operating bar 6 the current will now flow primarily in this operating by 6, since the current displacement is now barely apparent. Since the overall cross-sectional surface of the groove is primarily filled by copper, a very good conductivity value is produced and thus a high level of electrical efficiency.

Figure 5:
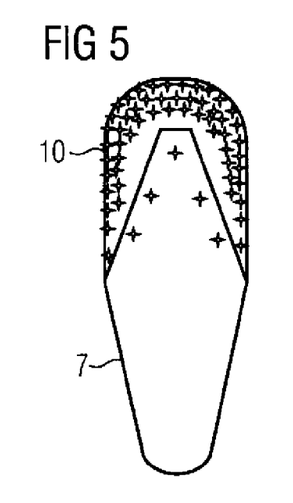
FIG. 5 shows a sheathed operating bar in accordance with a further embodiment of the invention during a starting process.

FIG. 5 shows a sheathed operating bar 7 in accordance with a further embodiment of the invention during the starting process. Here the operating bar 7 protrudes somewhat in the shape of a pitched roof into the outer area of the groove. Here too the starting bar is realized in the shape of a partial sheathing 10 which encloses this pitched roof-shape protrusion. This partial sheathing 10 has been manufactured from an aluminum melt by means of a die casting process.

Such a groove filling also shows, as is to be seen in FIG. 5, an effective improvement of the starting behavior with maximum copper filling of the groove.

Figure 6:
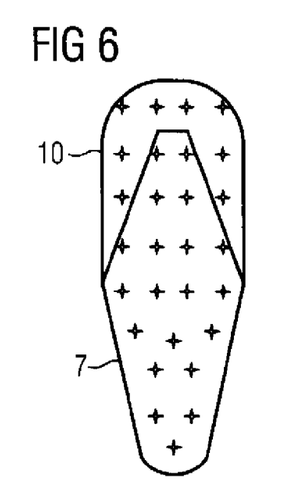
FIG. 6 shows the operating bar according to FIG. 5 during operation at rated speed.

As can be seen in FIG. 6, a comparatively large copper surface is available here too for current flow in normal operation, so that with such a cage rotor a high level of efficiency can be achieved in operation under rated conditions.

Figure 7:
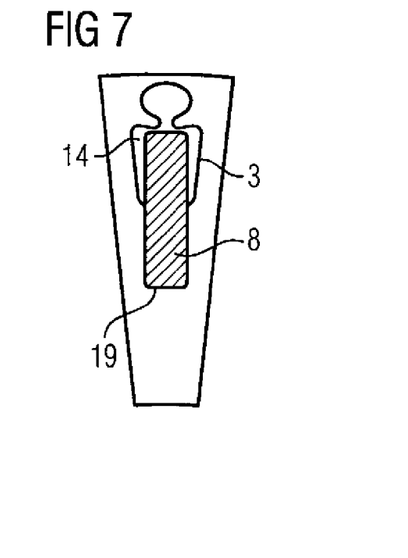
FIG. 7 shows a double-bar groove equipped with a standard flat bar.

FIG. 7 shows a double-bar groove equipped with a standard flat bar. This groove 3 is designed so that the normal flat bar, which fulfils the function of the operating bar 8, can be introduced almost without any play into the groove 3. In this case the normal flat bar is disposed in the groove such that it rests directly against the radially inner groove base 19. After the groove 3 has been equipped with the normal flat bar, a space 14 remains in the groove 3. This space 14 is disposed in the outer part, as seen in the radial direction, around the normal flat bar. The normal flat bar is also made of copper.

Figure 8:
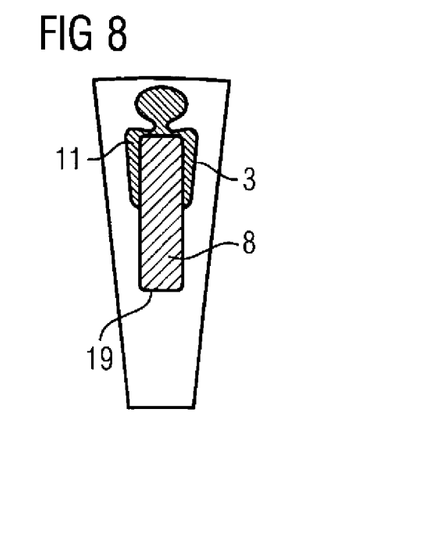
FIG. 8 shows the double-bar groove according to FIG. 7 after an aluminum die casting process.

FIG. 8 shows the double-bar groove according to FIG. 7 after an aluminum die casting process. The free space 14 is now filled with aluminum melt which forms a partial sheathing 11 of the standard flat bar in the radially outer area.

Figure 9:
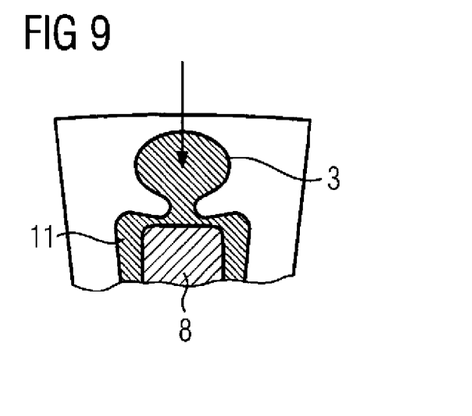
FIG. 9 shows a pressure effect exerted by the partial sheathing on the operating bar.

FIG. 9 shows a pressure effect exerted by the partial sheathing 11 on the operating bar 8 which occurs during the die casting process. The aluminum melt presses the standard flat bar against the inner groove base 19 as seen in the radial direction. In this way it is ensured that the standard flat bar rests against the inner groove base 19.

Figure 10:
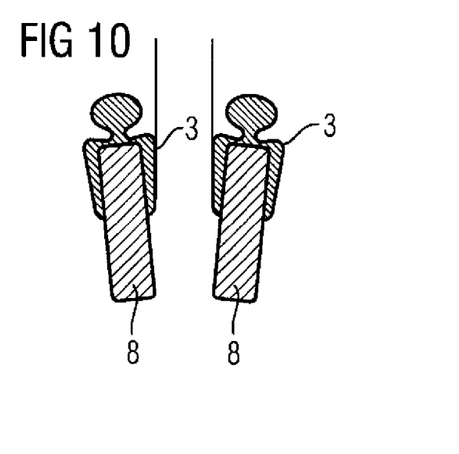
FIG. 10 shows two adjacent double-bar grooves according to the embodiment shown in FIG. 7.

FIG. 10 shows two adjacent double-bar grooves in accordance with the embodiment shown in FIG. 7. The grooves are disposed in relation to one another such that a sidewall is disposed in each case in parallel to the sidewall of the adjacent groove. In this way flux-conducting teeth are formed in the laminated rotor core with almost parallel side walls. This is caused by the raised shoulders of the grooves 3 in the area directed radially outwards. Such an arrangement has a positive effect on the flux distribution within the laminated rotor core.

Figure 11:
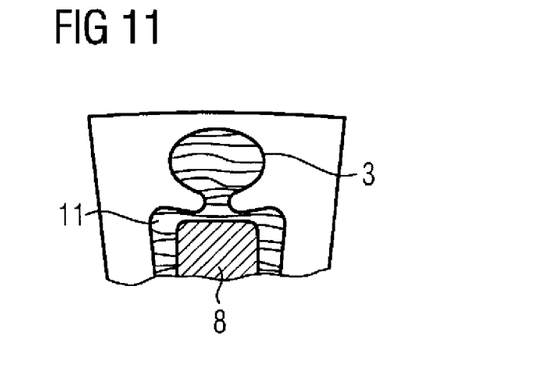
FIG. 11 shows the current distribution in the double-bar groove during a starting process.

FIG. 11 shows the current distribution in the double-bar groove during the starting process. The groove shape 11 selected here, by contrast with the shape shown in FIGS. 2 and 3, has a distinct groove area for a starting bar. This distinct groove area is still placed on the shoulder-shaped elements of the partial sheathing 11 and connected to these by a narrow web. This distinct starting groove area can be dispensed with the necessary if a smaller surface for the starting current is sufficient. In this case the surface obtained can be used for the operating bar 8 in order to increase the efficiency of the machine even further.

Figure 12:
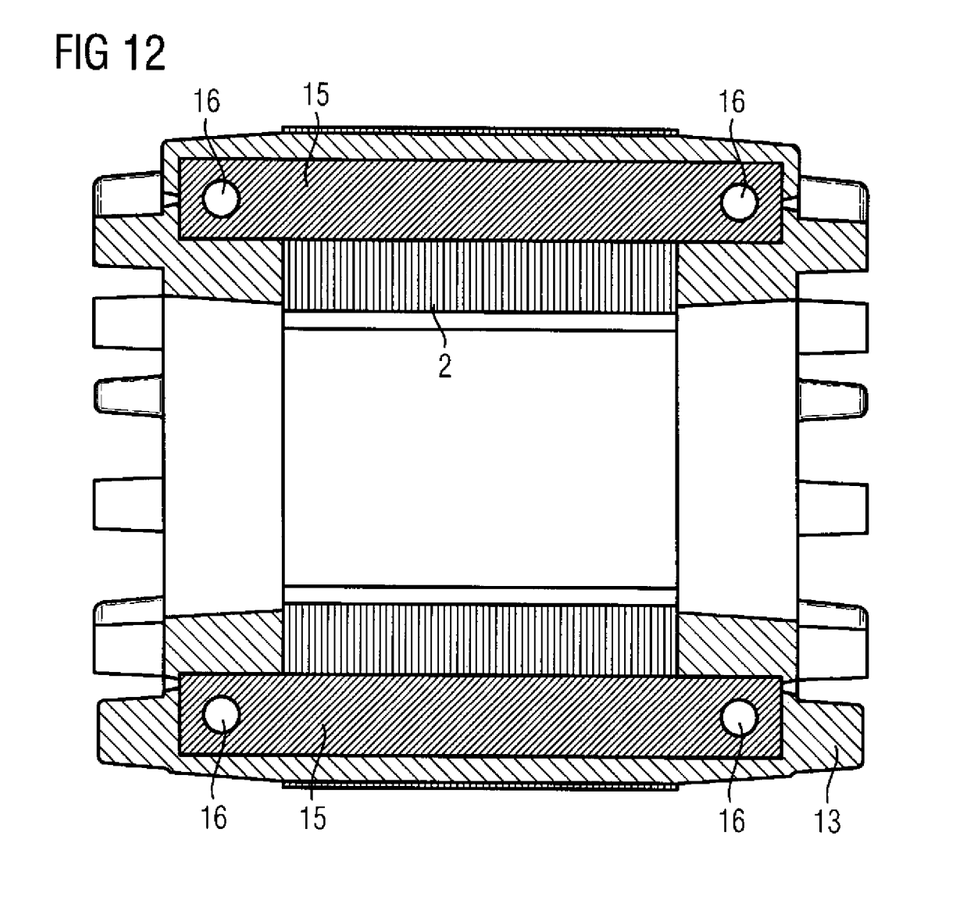
FIG. 12 shows a cross-sectional view of a laminated rotor core equipped with sheathed operating bars after a die casting process.

FIG. 12 shows a sectional view of a laminated rotor core 2 equipped with sheathed operating bar 15 after a die casting process with aluminum die cast melt. Short-circuit rings 13 are cast onto the end faces of the laminated rotor core 2 by means of the die casting process. During this aluminum die casting process the free spaces in the grooves which are not occupied by the operating bars 15 are simultaneously filled with aluminum melt.

To improve the binding of the operating bars 15 to the short-circuit rings 13, the bar ends projecting into the short-circuit rings 13 are tinned before the die casting process. This tinned layer results, during the application of the hot aluminum melt, in a mixed crystalline connection to the bar ends being formed. The tinned layer in this case is melted briefly and, on hardening of the melt, forms the desired alloy layer. In addition casting means 16 are provided in the form of through-holes in the area of the bar ends. Aluminum melts will pass through these through-holes during the die casting process. After hardening of the melt a form fit is achieved in this manner between the operating bars 15 and the short-circuit rings 13. It is thus guaranteed that even during the thermal cycles experienced by the rotor of the asynchronous machine, a consistently good mechanical and electrical connection exists between the operating bars 15 and the short-circuit rings 13. The transfer resistance between the bar ends and the short-circuit rings 13 can be kept small here even under load.

Figure 13:
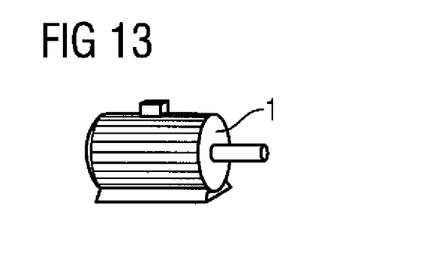
FIG. 13 shows an asynchronous machine with a cage rotor according to an embodiment of the invention.

FIG. 13 shows an asynchronous machine 1 equipped with a cage rotor in accordance with an embodiment of the invention. This asynchronous machine 1, as a result of the manufacturing method in which an aluminum die casting process is used, is very low-cost and easy to manufacture. A very high level of electrical efficiency is achieved by the use of operating bars made of copper, with which performance standards such as IE1, IE2 and even IE3 can be met without any problems. Even higher performance classes, which are not taken into account yet at the time of the invention in standard EN60034, are able to be realized with this design. This is attributable in particular to the fact that the largest possible groove surface is used for an operating bar. Through the partial sheathing disposed in the radially outer groove area the starting behavior of the machine is still positively influenced in a maximally efficient manner.

The invention claimed is:

1. A cage rotor for an asynchronous machine, said cage rotor comprising:
   a laminated rotor core having grooves; and
   operating bars arranged in the grooves and resting directly on the laminated rotor core at an inner groove base, as seen in a radial direction of the cage rotor,
   wherein each of the operating bars has a partial sheathing which sheathes only an outer part of the operating bar as seen in the radial direction of the cage rotor to thereby increase a height of the operating bar so that the operating bar extends farther in a direction of a rotor diameter outwards into the groove,
   wherein the partial sheathing is cast from a metal melt, and a material of said operating bar has a specific conductivity value which is higher than a specific conductivity value of a material of the partial sheathing cast from the metal melt.

2. The cage rotor of claim 1, wherein the partially sheathed operating bars completely fill the grooves.

3. The cage rotor of claim 1, wherein the partial sheathing has a concave shape on a side facing towards the operating bar and a convex shape on a side facing away from the operating bar.

4. The cage rotor of claim 1, wherein the material of the operating bars is copper and the material of the partial sheathing is aluminum.

5. The cage rotor of claim 1, further comprising short-circuit rings made from a material which is the same as the material of the partial sheathing and providing electrical contact between the operating bars and the partial sheathing of the operating bars on both end face sides of the cage rotor.

6. The cage rotor of claim 5, wherein the short-circuit rings are cast from the metal melt.

7. The cage rotor of claim 5, wherein the operating bars are tinned at least at ends of the operating bars at which the short-circuit rings are arranged.

8. The cage rotor of claim 5, wherein the operating bars have an electrically-applied coating at least at ends of the operating bars where the short-circuit rings are arranged, said coating enclosing the material of the short-circuit rings.

9. The cage rotor of claim 1, wherein the operating bars are embodied as especially standardized flat bars.

10. The cage rotor of claim 1, wherein the partial sheathing sheathes an outer surface and an adjoining peripheral surface of the outer part of the operating bar.

11. An asynchronous machine, comprising:
    a stator having a stator winding; and
    a cage rotor including a laminated rotor core having grooves, and operating bars arranged in the grooves and resting directly on the laminated rotor core at an inner groove base, as seen in a radial direction of the cage rotor, wherein each of the operating bars has a partial sheathing which sheathes only an outer part of the operating bar as seen in the radial direction of the cage rotor to thereby increase a height of the operating bar so that the operating bar extends farther in a direction of a rotor diameter outwards into the groove, wherein the partial sheathing is cast from a metal melt, and a material of the operating bar has a specific conductivity value which is higher than a specific conductivity value of a material of the partial sheathing cast from the metal melt.

12. The asynchronous motor of claim 11, wherein the partially sheathed operating bars completely fill the grooves.

13. The asynchronous motor of claim 11, wherein the partial sheathing has a concave shape on a side facing towards the operating bar and a convex shape on a side facing away from the operating bar.

14. The asynchronous motor of claim 11, wherein the material of the operating bars is copper and the material of the partial sheathing is aluminum.

15. The asynchronous machine of claim 11, further comprising short-circuit rings made from a material which is the same as the material of the partial sheathing and providing electrical contact between the operating bars and the partial sheathing of the operating bars on both end face sides of the cage rotor.

16. The asynchronous machine of claim 15, wherein the short-circuit rings are cast from metal melt.

17. The asynchronous motor of claim 15, wherein the operating bars are tinned at least at ends of the operating bars at which the short-circuit rings are arranged.

18. The asynchronous motor of claim 15, wherein the operating bars have an electrically-applied coating at least at ends of the operating bars where the short-circuit rings are arranged, said coating enclosing the material of the short-circuit rings.

19. The asynchronous motor of claim 11, wherein the operating bars are embodied as especially standardized flat bars.

20. The asynchronous machine of claim 11, wherein the partial sheathing sheathes an outer surface and an adjoining peripheral surface of the outer part of the operating bar.

21. A method for manufacturing a cage rotor for an asynchronous machine comprising:
  inserting operating bars into grooves of a laminated rotor core such that, at an inner groove base as seen in a radial direction of the cage rotor, each operating bar rests directly on the laminated rotor core and a space remains free at an outer groove area as seen in the radial direction, which space is not occupied by the operating bar;
  die casting of end face-side short-circuit rings and a partial sheathing of the operating bars in each groove, wherein the partial sheathing completely fills the space and sheathes only an outer part of the operating bars as seen in the radial direction of the cage rotor to thereby increase the height of the operating bar so that the operating bar extends farther in a direction of a rotor diameter outwards into the groove,
  wherein the partial sheathing is cast from a metal melt, and a material having a specific conductivity value which is lower than a specific conductivity value of material of the operating bars is used as the metal melt to cast the partial sheathing.

22. The method of claim 21, wherein the partial sheathing has a concave shape on a side facing towards the operating bar and a convex shape on a side facing away from the operating bar.

23. The method of claim 21, wherein the operating bars are made of copper and the metal melt is made of aluminum.

24. The method of claim 21, wherein the operating bars are tinned, at least at ends of the operating bars on which the short-circuit rings are arranged, before the die casting.

25. The method of claim 21, wherein the operating bars are galvanized, at least at ends of the bars on which the short-circuit rings are arranged before the die casting, for application of a coating made of a material which is the same as a material of the short-circuit rings.

* * * * *

UNITED STATES PATENT AND TRADEMARK OFFICE
CERTIFICATE OF CORRECTION

| | | |
|---|---|---|
| PATENT NO. | : 8,963,394 B2 | Page 1 of 1 |
| APPLICATION NO. | : 13/391147 | |
| DATED | : February 24, 2015 | |
| INVENTOR(S) | : Klaus Büttner, Klaus Kirchner and Michael Müller | |

It is certified that error appears in the above-identified patent and that said Letters Patent is hereby corrected as shown below:

Title Page

Item (73): Please change Assignee: "SIEMENS AG, MÜNCHEN, INGOLSTADT" to --SIEMENS AKTIENGESELLSCHAFT, MÜNCHEN, GERMANY--

Signed and Sealed this
Second Day of June, 2015

Michelle K. Lee
*Director of the United States Patent and Trademark Office*

UNITED STATES PATENT AND TRADEMARK OFFICE
CERTIFICATE OF CORRECTION

PATENT NO. : 8,963,394 B2
APPLICATION NO. : 13/391147
DATED : February 24, 2015
INVENTOR(S) : Büttner et al.

Page 1 of 1

It is certified that error appears in the above-identified patent and that said Letters Patent is hereby corrected as shown below:

This certificate supersedes the Certificate of Correction issued June 2, 2015. The certificate is vacated since petition to correct assignee under 3.81 (b) was not acted on by the Office of Petitions. The Certificate of Correction was published in error and should not have issued.

Signed and Sealed this
Fourth Day of August, 2015

Michelle K. Lee
*Director of the United States Patent and Trademark Office*

UNITED STATES PATENT AND TRADEMARK OFFICE
CERTIFICATE OF CORRECTION

PATENT NO. : 8,963,394 B2  
APPLICATION NO. : 13/391147  
DATED : February 24, 2015  
INVENTOR(S) : Klaus Büttner, Klaus Kirchner and Michael Müller Page 1 of 1

It is certified that error appears in the above-identified patent and that said Letters Patent is hereby corrected as shown below:

Title Page
Item (73) Please change Assignee: "SIEMENS AG, MÜNCHEN, INGOLSTADT" to --SIEMENS AKTIENGESELLSCHAFT, MÜNCHEN, GERMANY--

Signed and Sealed this
Second Day of February, 2016

Michelle K. Lee
*Director of the United States Patent and Trademark Office*